Figure 1:
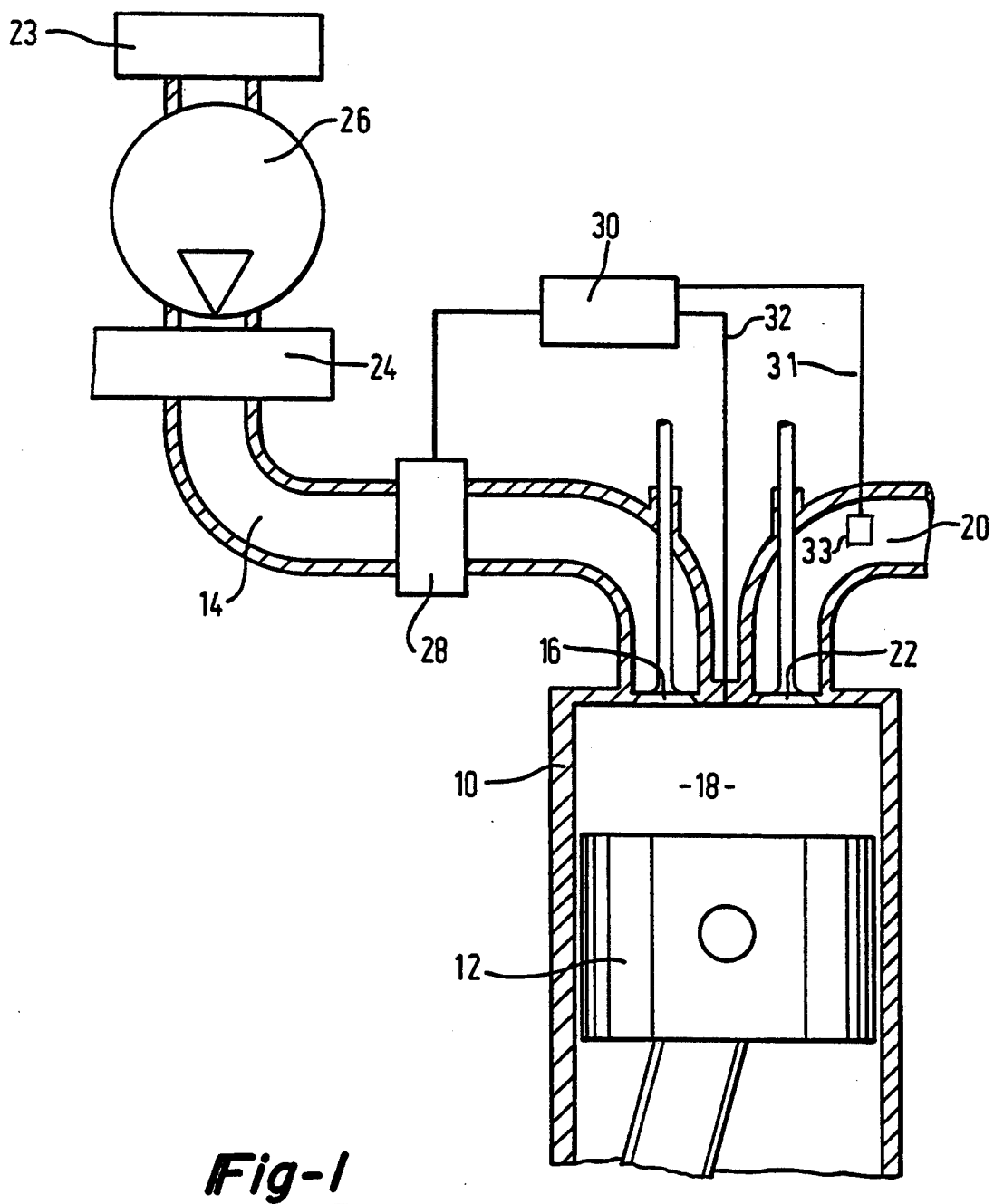

United States Patent [19]

Schatz

[11] Patent Number: 5,353,763
[45] Date of Patent: Oct. 11, 1994

[54] METHOD OF SUPPLYING A COMBUSTIBLE GAS INTO THE COMBUSTION CHAMBER OF AN INTERNAL COMBUSTION ENGINE IN TWO PHASES

[76] Inventor: Oskar Schatz, Waldpromenade 16, D-8035 Gauting, Fed. Rep. of Germany

[21] Appl. No.: 990,428

[22] Filed: Dec. 15, 1992

[30] Foreign Application Priority Data

Dec. 16, 1991 [DE] Fed. Rep. of Germany ....... 4141482

[51] Int. Cl.$^5$ .......................... F02D 9/02; F02D 41/14
[52] U.S. Cl. .................... 123/403; 123/316; 123/672; 123/184.53
[58] Field of Search .................. 123/52 MF, 403, 672, 123/679, 683, 687, 697

[56] References Cited

U.S. PATENT DOCUMENTS

| | | | |
|---|---|---|---|
| 4,796,584 | 1/1989 | Goto et al. | 123/52 MF |
| 5,074,268 | 12/1991 | Schatz et al. | 123/403 |
| 5,080,065 | 1/1992 | Nomura et al. | 123/52 MF |
| 5,111,792 | 5/1992 | Nagai et al. | 123/697 X |
| 5,115,782 | 5/1992 | Klinke et al. | 123/687 |
| 5,131,365 | 7/1992 | Schatz | 123/403 |

FOREIGN PATENT DOCUMENTS

| | | |
|---|---|---|
| 0105509 | 4/1984 | European Pat. Off. . |
| 0419743 | 4/1991 | European Pat. Off. . |
| 2423576 | 11/1975 | Fed. Rep. of Germany . |

*Primary Examiner*—Willis R. Wolfe
*Attorney, Agent, or Firm*—Harness, Dickey, & Pierce

[57] ABSTRACT

A method of supplying a combustible gas into a combustion chamber of an internal combustion engine of the cylinder type during two phases. The supply of combustible gas is restricted at least towards the end of the first phase and restricting the supply of the combustible gas is terminated at least during the beginning of the second phase which ends when the piston begins to compress a charge in the combustion chamber. In this method the extent of restricting the supply of combustible gas and the times of starting and terminating to restrict the supply of combustible gas and the time of terminating the supply of combustible gas are coordinated such that the resultant piston work corresponds to the work necessary for filling the combustion chamber with a desired amount of combustible gas plus the energy necessary to increase the temperature of the charge for a predetermined amount.

21 Claims, 2 Drawing Sheets

METHOD OF SUPPLYING A COMBUSTIBLE GAS INTO THE COMBUSTION CHAMBER OF AN INTERNAL COMBUSTION ENGINE IN TWO PHASES

The present invention relates to a method of supplying a combustible gas into a combustion chamber of an internal combustion engine.

In the context of this application the combustible gas may be air, a fuel-air mixture, hydrogen or any other gas adapted to be used in an internal combustion engine.

In the art of internal combustion engines it has become known to increase the temperature within the combustion chamber at times when the engine is started from cold and at other times when there is a thermal energy deficiency condition of the engine in order to provide for early ignition of the engine, to reduce pollutant emission and to cut down the fuel consumption rate. Due to the temperature increase resulting in a more rapid evaporation of fuel "conditioning" of the fuel-air mixture is also improved.

A known measure is to preheat the combustible gas; i.e. the combustible gas is heated in a heat exchanger before it flows into the engine cylinder. However, substantial heat energy is dissipated along the path from the heat exchanger to the engine cylinder. When the combustible gas is heated, it expands; the more the combustible gas is heated, the more reduced is the amount of combustible gas fed into the engine cylinder so that for example in Diesel type engines the torque capabilities are reduced so as to cause problems when starting the engine from cold and during normal operation of the engine. Responsiveness of such heating is relatively slow due to the long flow paths of the combustible gas. In the so-called CVS testing method the main pollutant emission occurs already after 20 seconds due to a load peak provided at this time. In view thereof the known method of preheating the combustible gas becomes effective too late and should be switched off during this load peak situation with many types of engines in order to allow for feeding of sufficient amount of combustible gas. Furthermore, preheating the combustible gas requires a relatively substantial amount of energy.

Accordingly it would be desirable to produce the thermal energy necessary for a pollutant emission free and economical combustion directly within the combustion chamber, i.e. to heat the walls of the combustion chamber and the combustible gas (i.e. the air or the fuel-air mixture) to an optimal temperature at the beginning of compression of the combustible gas, and furthermore to ensure that sufficient amounts of combustible gas are supplied during load peak conditions.

From German published application 38 24 133 it has become known to generate thermal energy by mechanical pulse charging immediately before the compression stroke of the engine piston. However, also in this case the intake manifold is being heated and this heating results in substantial compression of the charged air and a corresponding high mass flow rate of the combustible gas.

Furthermore, this known method is not suited for operating the combustion engine at high temperatures during all operative conditions of thermal energy deficiency, in particular when there is a small demand of combustible gas such as during the idling operation of Otto type engines.

Accordingly it is an object of the present invention to provide an economical method to rapidly and effectively heat the contents and the boundary surfaces of the combustion chamber to optimal temperatures during all operating conditions and at times of both high and low demand for combustible gas.

A further object of the invention is to provide for improved conditioning of the fuel-air mixture.

In order to attain these objects, the present invention provides a method of supplying a combustible gas into a combustion chamber of an internal combustion engine of the piston cylinder type during a first phase and during a second phase following said first phase, the supply of combustible gas being restricted at least towards the end of said first phase and restricting the supply of the combustible gas being terminated at least during the beginning of said second phase which ends when the piston associated with the combustion chamber begins to compress a charge of combustible air in the combustion chamber. In this method the extent of restricting the supply of combustible gas and the times of starting and terminating to restrict the supply of combustible gas and the time of terminating the supply of combustible gas are coordinated such that the resultant piston work corresponds to the work necessary for filling the combustion chamber with a desired amount of combustible gas plus the energy necessary to increase the temperature of said charge for a predetermined amount.

The present invention starts from the above described method of dynamically charging the combustible gas. Due to the restriction of the combustible gas supply during the first phase the piston during its suction stroke generates—by additional work—a vacuum causing combustible gas to flow into the combustion chamber at increased velocity during the second phase when restricting the supply of combustible gas has been terminated. The kinetic energy of such inflowing combustible gas causes compression of the gas and accordingly is converted into pressure energy. The temperature increase resulting therefrom ideally corresponds to that of an adiabatic process.

The thermal energy resulting from the kinetic energy of the gas is generated directly within the combustion chamber. It may be obtained also in conditions of low demand for combustible gas by using respective flow velocities of the combustible gas during the second phase. Accordingly, this method is particularly suited for solving the above defined object.

When there is a thermal energy demand, the coordination of the above parameters in accordance with the present invention is selected so that the piston work which is converted into kinetic energy of the inflowing combustible gas in the second phase substantially exceeds the amount of work necessary for an eventual compression so that the resultant difference in work is converted into thermal energy. The present invention allows for a temperature increase of at least 200° C. and a simultaneous increase of the gas mass flow rate, a result which is not obtainable by any of the known methods. In the method of the present invention the resulting density and the amount of inflowing combustible gas do not automatically result from the kinetic energy of the inflowing gas as in the above mentioned known dynamically charging method; rather the amount of combustible gas may be selectively defined or limited by selecting the duration of gas inflow in accordance with the desired actual engine load so that the excess energy must be converted into thermal energy. Accordingly control of temperature increase is independent of control of the amount of combustible gas; in particular the amount of combustible gas may be smaller than that resulting from unrestricted flow of combustible gas.

At times when the engine is started from cold there is a beneficial interrelationship between the temperature of the combustion chamber walls during the compression stroke and the piston compression work as a result of the additional heating of the combustible gas. A high wall temperature results in an increase of compression work. This causes an increase of the combustion chamber temperature resulting in an increase of the wall temperature for the next operation cycle. This ensures early ignition so as to minimize electrical energy consumption of the starter motor, and heating of the combustion chamber is accelerated in an exponential manner from one ignition cycle to the next one.

The method according to the present invention enables to operate the internal combustion engine with a lean air-fuel mixture from the very beginning.

Presently there are three common modes of operation of internal combustion engines including engines both of the carburetor type and the fuel injection type, namely an operation without a catalytic converter, an operation with an one-way catalytic converter and an operation with a closed loop controlled three-way catalytic converter.

In the operation of an engine provided with a closed loop controlled three-way catalytic converter an oxygen sensor in the exhaust gas—additional to the use of a carburetor or fuel injection means along with air mass flow sensing means—is required to precisely sense the actual fuel-air ratio in order to enable precise control of the actual operative condition of the engine according to an optimal fuel-air ratio.

In the operation of an engine provided with a closed loop controlled three-way catalytic converter the carburetor or the air mass flow sensor are required only to enable operation of the engine when it is still cold, at which times the exhaust gas does not contain any excess air because the engine must be operated with an overrich fuel-air mixture. When using the method of the present invention such carburetors and air mass flow sensors may be dispensed with in all of the three above-mentioned modes of operation due to the fact that according to the present invention the engine may be operated with a lean mixture at all times, in particular when the engine is started from cold.

From the high velocities and temperatures of the inflowing combustible gas results an excellent fuel "conditioning". In particular the method of the present invention may be used also in connection with alternative fuels, in particular fuels of high evaporation energy such as alcoholic substances.

With respect to Otto type engines, an important advantage of the present invention is that the engine may be operated at high combustible gas temperatures in the CVS testing method during the first load peak condition two seconds after starting the engine despite maintaining the full torque capabilities of the engine.

With respect to Diesel engines an advantage is the improvement of the cold starting characteristics thereof. A further important advantage is that the torque capabilities of the Diesel engine are substantially improved due to the temperature increase of the combustible gas resulting in an improved combustion thereof and due to the increase of the amount of inflowing combustible gas. Accordingly the present invention overcomes a substantial drawback of Diesel type engines; the torque capabilities of the Diesel engine will become similar to those of the Otto type engine. This will improve customer acceptance of Diesel type engines, which is desirable in particular in view of their low fuel consumption rates.

Furthermore, the method of the present invention allows to reduce engine compression ratios both in Otto and Diesel type engines and to operate both Otto and Diesel type engines at variable compression ratios. As a result the fuel consumption rate can be minimized.

If there is a demand for thermal energy, the coordination of the above parameters in accordance with the present invention is selected so that the piston work provides not only the energy necessary for feeding the required amount of combustible gas into the combustion chamber, but provides excess kinetic energy that is converted into thermal energy. When the temperature approaches the operative temperature, the above coordination is changed so that conversion of kinetic energy into thermal energy is reduced and finally terminated. The means for performing the method of the present invention may be used to change the compression rate and/or to dynamically charge the combustible gas if desired.

Initially when the engine is started the piston suction work is performed by the starter motor and the electric battery driving the engine via the starter motor. After ignition the engine itself performs the so-called charge changing work. In the method of the present invention the work to be performed by the electric battery is less than in conventional methods because an initial increase of work is more than compensated by a reduction of the duration of operation of the battery because of the improved cold starting characteristics of the present invention. Furthermore, in case of weak electrical batteries, operation in accordance with the present invention may be delayed until after ignition. Due to the combustible gas temperature increase effective already during the first suction stroke the walls of the combustion chamber are internally heated. As a result the polytropic exponent increases with the following piston compression stroke and accordingly the temperature increase due to compression by the piston rises. Furthermore compression by the piston starts from a higher temperature-level.

The above mentioned prior art methods of for example preheating or pulse charging of the combustible gas suffer from the drawback that the increase of the air temperature and the increase of the amount of inflowing air are interlinked. In the method of preheating the combustible gas the amount of combustible gas flowing into the combustion chamber decreases with a temperature increase. In the method of pulse charging the temperature of the combustible gas increases with an increase of the amount of inflowing combustible gas. In contrast thereto the present invention offers the advantage of allowing to change the temperature and the amount of the combustible gas independently of each other and that the amount of the combustible gas may be either increased of decreased in contrast to the conventional methods where airflow is unrestricted.

An important advantage of the present invention is an improved conditioning of the fuel-air mixture. On the one hand the temperature increase in the combustion chamber results in an accelerated evaporation of the fuel, and the ignition characteristics of the fuel-air mixture are improved. On the other hand the high flow velocities of the combustible gas during the second phase result in increased flow turbulence in the combustion chamber which will improve the intermixing of the fuel and air.

In internal combustion engines which are operated by means of an air-fuel mixture it is preferred that fuel is supplied such that the fuel is acted upon by the stream of air flowing at increased velocity during the second phase in order to improve conditioning of the fuel-air mixture.

This may be achieved by supplying the fuel directly into the stream of air flowing at increased velocity. As an alternative the fuel may be supplied upstream of the location of restricting the supply of combustible gas and/or prior to termination of restricting the supply of combustible air. For fuel supply injector, carburetor or any other suitable means may be used.

The increased flow velocities of the air during the second phase result in an increase of flow turbulence with a corresponding reduction of the thickness of the boundary layers. This causes thorough intermixing of fuel and air and reduces the risk of wetting the intake walls with fuel. Increased flow turbulence furthermore ensures fine atomization and uniform distribution of the fuel within the air. Due to the high flow turbulence and reduction of the thickness of boundary layers evaporation of the fuel is enhanced additional to being enhanced by the temperature increase resulting from the "dynamic charging" process of the present invention. From the above it should be apparent that the present invention provides for a substantial improvement in conditioning of the fuel-air mixture both in Otto and Diesel type engines.

According to a further aspect of the present invention coordination of the extent and the times of start and termination of restricting the supply of combustible gas is performed such that at least during the beginning of the second phase a supersonic pressure ratio between the pressure upstream of the location of restricting the supply of combustible gas and the pressure in the combustion chamber will result.

The supersonic pressure ratio and supersonic flow velocities result in compression waves causing a substantial increase of the temperature of the combustion air. This allows to further improve the combustion characteristics of the engine during thermal energy deficiency conditions thereof. Additionally, conditioning of the fuel-air mixture will result be improved further.

In connection with Otto type engines it is preferred to position the means for restricting the supply of combustible gas to the combustion chamber upstream of an inlet valve of the combustion chamber in order to heat the intake manifold walls immediately upstream of the combustion chamber and to readily evaporate fuel impinging thereon, thereby reducing the emission of hydrocarbons.

According to a further development of the present invention restricting the supply of combustible gas is delayed for at least one ignition cycle at times when the internal combustion engine is started from cold. This allows to reduce electrical load peaks.

When the method of the present invention is used in a combustion engine of the fuel injection type, fuel injection is delayed for at least one ignition cycle at times when the internal combustion engine is started from cold in order to prevent ignition errors causing high pollutant emissions.

According to a preferred embodiment of the present invention the extent and the timing of restricting the supply of combustible gas and the time of terminating the supply of combustible gas are controlled in response to the operative temperature, the speed and the load conditions of the internal combustion engine.

According to the present state of the measuring and control art such a control may be performed by use of a computer or processor. In such method of controlling an internal combustion engine in accordance with the method of the present invention the amount of combustible gas and the temperature of combustible gas are considered separately. The amount of combustible gas is predetermined by the actual load situation of the engine whereas control of the temperature of the combustible gas is mainly related to the so-called operative temperature the importance of which as a control parameter has not yet been fully acknowledged in the prior art.

In connection with the method of the present invention control of the temperature of the combustible gas is of relevance in particular with respect to the cold starting problems and thermal energy deficiency conditions of the engine.

In the use of the method of the present invention in Otto type engines it is preferred that a desired amount of combustible gas and a desired increase of the temperature of the combustible gas are preselected for each ignition cycle and the extent and timing of restricting the supply of combustible gas and terminating the supply of combustible gas are determined in response thereto. The same process is possible in connection with Diesel type engines because the method of the present invention allows both to increase and decrease the amount of combustible gas so that the engine may be operated at an optimal fuel air ratio at all times.

In accordance with a preferred embodiment of the present invention the energy necessary for feeding the total amount of combustible gas into the combustion chamber-and necessary to obtain a desired increase of the temperature of the total amount of combustible gas is being determined, said energy corresponding both to the kinetic energy of the combustible gas and the suction energy provided by the piston and the total amount of combustible gas consisting of a first partial amount of combustible gas flowing during said first phase and a second partial amount of combustible gas flowing during said second phase, the required minimum second partial amount of combustible gas is being determined taking into account the critical flow velocity of the combustible gas which limits the maximum amount of kinetic energy per mass of combustible gas, the minimum duration of flow of said second partial amount of combustible gas into the combustion chamber is being determined taking into account the available flow cross-sections of respective intake means, with such minimum duration defining the latest time for said second partial amount of combustible gas to begin to flow into the combustion chamber, and the preselected time for the combustible gas to begin to flow into the combustion chamber and a possibly required first partial amount of combustible gas corresponding to said necessary suction work are being optimized in a following iteration process.

Because the present invention allows to operate an engine with a lean mixture from the very beginning the air-fuel ratio may be controlled by means of an oxygen sensor means in the exhaust gas so as to provide for a lean mixture operation. The oxygen sensor means detects any excess air and maintains its proportion for example at 20%. This allows to dispense with the complex air mass sensors and carburetors of the prior art.

While there is no normal warm-up phase due to the instantaneous increase of the combustion chamber temperature to a value suitable for lean mixture operation, a—slight—delay for the oxygen sensor in the exhaust gas stream to become effective is hardly avoidable.

This is why the air fuel ratio is preferably adjusted by controlling the air mass flow rate on the basis of experimental data and general data during the period of starting the engine.

Alternatively the oxygen sensor means is preheated before starting the engine.

In an internal combustion engine including an air intake system provided with a charger means and means for restricting the supply of combustible gas, the combustible gas may be charged by said charger means upstream of said restricting means.

In an internal combustion engine with an air intake system provided with means for restricting the supply of combustible gas, the combustible gas mass flow rate may be controlled upstream of said restricting means in response to the operative condition of the internal combustion engine. This allows to extend the range within which the temperature and the mass flow rate of the combustible gas may be controlled independently from each other. For example during idling conditions of the engine the temperature within the combustion chamber may be increased without increasing the mass flow rate of the combustible gas.

In an automotive internal combustion engine associated with a driver pedal, the amount of fuel may be influenced by the driver pedal and the fuel air ratio may be preselected on the basis of general operative data and may be controlled by sensing any excess oxygen in the exhaust gas by means of said oxygen sensor means.

Figure 2:
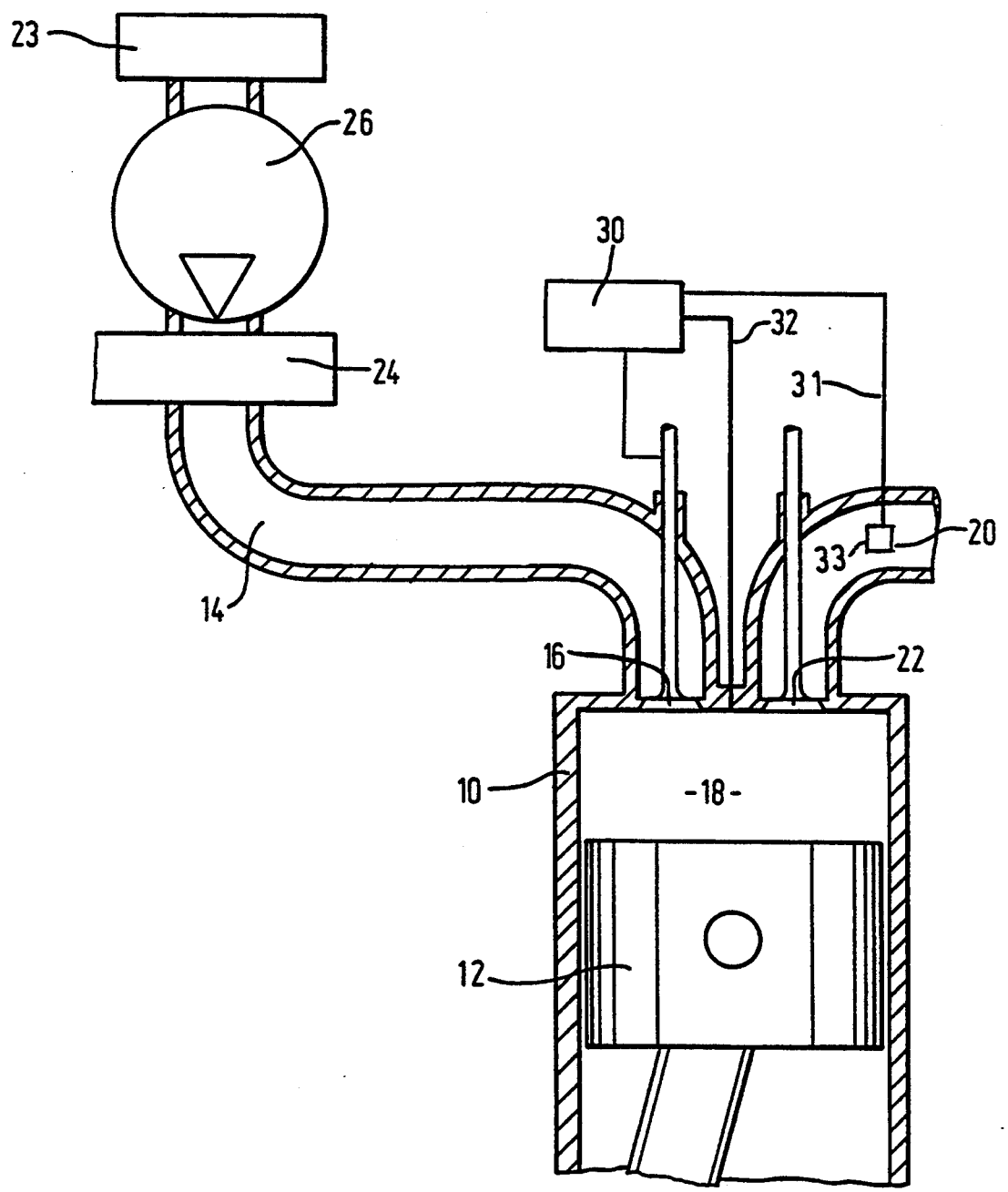

With reference to the drawings, FIG. 1 shows diagrammatically a cross-section of a piston cylinder assembly of an internal combustion engine; and FIG. 2 is the same as FIG. 1 except the additional value has been eliminated.

The drawing shows only one cylinder 10 of an internal combustion engine, which cylinder 10 slidingly receives a reciprocable piston 12. An inlet passage 14 opens into a combustion chamber 18 with an inlet valve 16 being disposed at the location where the inlet passage 14 opens into the combustion chamber 18. An exhaust passage 20 is in fluid communication with the combustion chamber 18 via an outlet valve 22.

The inlet passage 14 receives air via an air filter 23 and an intake manifold 24, the air being drawn into the combustion chamber 18 by the piston 12 during the suction stroke when the inlet valve 16 has been opened. Furthermore, the air filter 23 may be followed by a charger device 26 for precharging or precompressing the air. If desired the fuel may be fed into the air flowing through inlet passage 14 so that a fuel air mixture instead of air flows through the inlet valve 16 into the combustion chamber 18.

As mentioned above instead of air or a fuel air mixture another gas such as hydrogen may be used in the present invention.

At a location upstream of inlet valve 16 the inlet passage 14 includes an additional valve 28 which is arranged to fully or partially close inlet passage 14 so as to fully or partially restrict fluid flow therethrough. A control unit 30 indicated only in a diagrammatic manner is associated with the additional valve 28. The control unit 30 receives via a line 32 signals indicative of the operative condition of the engine and, if desired, signals representing the commands of a driver of an associated automotive vehicle.

The additional valve 28 allows to supply the combustible gas into the combustion chamber 18 in two partial streams during two phases.

Initially the additional valve 28 may be open so that a charge of air or of a fuel air mixture may flow into the cylinder 10. In response to signals from the control unit 30 the additional valve 28 may be moved to a closed or intermediate position so as to fully or partially restrict the supply of combustible gas to the combustion chamber 18 during a first phase. It is to be understood that during said first phase there may be no supply of combustible gas at all or a restricted supply of combustible gas.

During such closed or throttled condition of the additional valve 28 the pressure within the combustion chamber 18 is reduced by the respective piston work. When in a second phase the additional valve 28 is reopened the pressure reduction in the combustion chamber 18 causes the combustible gas to flow into the combustion chamber 18 at an increased velocity. When the combustible gas flowing at the increased velocity is slowed down in the combustion chamber 18, this causes an additional compression of the combustible gas resulting in an increase of the pressure and temperature of the charge within the cylinder 10. In other words, the kinetic energy of the inflowing combustible gas is converted into thermal energy. By appropriate selection of the duration and the times of beginning and terminating restriction of fluid flow through the additional valve 28 the additional kinetic energy is determined so that the excess energy converted into thermal energy causes an increase of the temperature within the combustion chamber to a desired level.

In order to select the mass flow rate of the combustible gas according to the actual demand of the engine independently of any desired temperature increase the duration of fluid flow in the second phase is controlled and, if necessary, is terminated by reclosing the additional valve 28 before the inlet valve 16 is closed. In this connection any flow of combustible gas into the combustion chamber during the first phase will have to be taken into account.

Because the temperature of the combustion chamber may be maintained at a level allowing for lean mixture operation of the engine from the very beginning when the engine is started, the usual air mass flow rate sensor or carburetor for controlling the fuel air ratio may be dispensed with. Control of the engine may be performed by means of oxygen sensor means (not shown) disposed in the exhaust passage 20 so as to sense the oxygen content in the exhaust gas. This allows to reduce the costs at least in an engine system using a three-way catalytic converter, but also to reduce pollutant emission at times when the engine is started from cold and during normal operation of the engine, and to reduce the fuel consumption rate.

FIG. 2 illustrates an alternate embodiment of the present invention. FIG. 2 is similar to FIG. 1 and the elements corresponding to those of FIG. 1 are given the same numbers. In FIG. 2, the inlet valve 16 is variably controlled by control unit 30. Also, the additional valve 28 is removed.

I claim:

1. A method of supplying a combustible gas into a combustion chamber of an internal combustion engine during a first phase and during a second phase following said first phase, a supply of combustible gas being restricted at least towards the end of said first phase and restricting the supply of the combustible gas being terminated at least during the beginning of said second phase which ends when a piston associated with the combustion chamber begins to compress a charge of combustible gas in the combustion chamber, and restricting the supply of combustible gas and timing of starting and terminating the supply of combustible gas and timing of terminating the supply of combustible gas are coordinated such that the resultant piston work corresponds to feed and compression work necessary for filling the combustion chamber with a desired amount of combustible gas plus an additional amount of energy necessary to increase the temperature of said charge above a temperature value the combustible gas would attain when it were compressed in an adiabatic manner.

2. A method according to claim 1, wherein restricting the supply of combustible gas occurs upstream of inlet valve means of said combustion chamber.

3. A method according to claim 1, wherein terminating the supply of combustible gas occurs upstream of inlet valve means of said combustion chamber.

4. A method according to claim 1, wherein restricting the supply of combustible gas is provided by variably controlling inlet valve means of said combustion chamber.

5. A method according to claim 1, wherein terminating the supply of combustible gas is provided by inlet valve means of said combustion chamber.

6. A method according to claim 1, wherein restricting the supply of combustible gas is delayed for at least one ignition cycle at times when the internal combustion engine is started from cold.

7. A method according to claim 1 for use in a fuel injected internal combustion engine, wherein fuel injection is delayed for at least one ignition cycle at times when the internal combustion engine is started from cold.

8. A method according to claim 1 wherein the extent and the timing of restricting the supply of combustible gas and the time of terminating the supply of combustible gas are controlled in response to the operative temperature, the speed and the load conditions of the internal combustion engine.

9. A method according to claim 1, wherein a desired amount of combustible gas and a desired increase of temperature of the combustible gas are preselected for each ignition cycle and the extent and timing of restricting the supply of combustible gas and terminating the supply of combustible gas are determined in response thereto.

10. A method according to claim 9 including the following steps in the following order: the energy necessary for feeding the total amount of combustible gas into the combustion chamber and necessary to obtain a desired increase of the temperature of the total amount of combustible gas is being determined, said energy corresponding both to the kinetic energy of the combustible gas and the suction energy provided by the piston, the total amount of combustible gas consisting of a first partial amount of combustible gas flowing during said first phase and a second partial amount of combustible gas flowing during said second phase, the minimum duration of flow of said second partial amount of combustible gas into the combustion chamber is being determined by taking into account the available flow cross-sections of respective intake means, with such minimum duration defining the latest time for said second partial amount of combustible gas to begin to flow into the combustion chamber, and the preselected time for the combustible gas to begin to flow into the combustion chamber and a possibly required first partial amount of combustible gas corresponding to said necessary suction work are being optimized in a following iteration process.

11. A method according to claim 1 for use in an internal combustion engine operated by an air-fuel mixture, in which method the air-fuel ratio is controlled by means of oxygen sensor means in the exhaust gas so as to provide for lean mixture operation.

12. A method according to claim 1 for use in an internal combustion engine including an intake system provided with charger means and restricting means for restricting the supply of combustible gas, in which method the combustible gas is charged by said charger means upstream of said restricting means.

13. A method according to claim 1 for use in an internal combustion engine with an intake system provided with restricting means for restricting the supply of combustible gas, in which method the combustible gas mass flow rate is controlled upstream of said restricting means in response to an operative condition of the internal combustion engine.

14. A method according to claim 11, wherein the air fuel ratio is adjusted by controlling the air mass flow rate on the basis of experimental data and general data during the period of starting the engine.

15. A method according to claim 11, wherein said oxygen sensor means is preheated before the engine is started.

16. A method according to claim 11 for use in an automotive internal combustion engine associated with a driver pedal, in which method the amount of fuel is influenced by the driver pedal and the air-fuel ratio is preselected on the basis of general operative data and is controlled by sensing any excess oxygen in the exhaust gas by means of said oxygen sensor means.

17. A method according to claim 1 for use in an internal combustion engine operated by means of an air-fuel mixture, in which method fuel is supplied such that the fuel is acted upon the stream of air flowing at increased velocity during the second phase in order to improve the conditioning of the fuel-air mixture.

18. A method according to claim 17 wherein the fuel is supplied directly into said stream of air flowing at increased velocity.

19. A method according to claim 17 wherein the fuel is supplied upstream of the location of restricting the supply of combustible gas prior to termination of restricting the supply of combustible gas.

20. A method according to claim 1 wherein said coordination of the extent and the times of start and termination of restricting the supply of combustible gas is performed such that at least during the beginning of the second phase a supersonic pressure ratio between the pressure upstream of the location of restricting the supply of combustible gas and the pressure in the combustion chamber will result.

21. A method of supplying a combustible gas into a combustion chamber of an internal combustion engine during a first phase and during a second phase following said first phase, a supply of combustible gas being restricted at least towards the end of said first phase and restricting the supply of the combustible gas being terminated at least during the beginning of said second phase which ends when the piston associated with the combustion chamber begins to compress a charge of combustible gas in the combustion chamber, and restricting the supply of combustible gas and timing of starting and terminating to restrict the supply of combustible gas and timing of terminating the supply of combustible gas are coordinated such that the resultant piston work corresponds to the work necessary for filling the combustion chamber with a desired amount of combustible gas, said restricting of the supply of combustible gas being provided by variably controlling inlet valve means of said combustion chamber.

* * * * *